United States Patent
Kaye

[11] 3,801,199
[45] Apr. 2, 1974

[54] IMAGE PROJECTION SYSTEM WITH FILMSTRIP CASSETTE

[76] Inventor: Robert Lee Kaye, 10835 Santa Monica, Los Angeles, Calif. 90025

[22] Filed: Jan. 10, 1972

[21] Appl. No.: 216,546

[52] U.S. Cl. .................................. 353/74, 353/120
[51] Int. Cl. ...................... G03b 21/10, G03b 21/30
[58] Field of Search .......... 353/19, 26, 27; 352/191, 352/129, 126, 128, 72

[56] References Cited
UNITED STATES PATENTS

| | | | |
|---|---|---|---|
| 3,139,789 | 7/1964 | Schrader | 352/128 |
| 2,587,123 | 2/1952 | Dunning | 352/191 |
| 3,597,058 | 8/1971 | Nicosia | 352/129 |
| 3,677,628 | 7/1972 | Walker | 352/128 |
| 3,361,031 | 1/1968 | Stroud | 353/27 |

Primary Examiner—Louis R. Prince
Assistant Examiner—A. J. Mirabito

[57] ABSTRACT

An image projection system with fiber optics pivotally mounted to engage a filmstrip cassette in a light coupling position is described. A film engagement mechanism for advancing the filmstrip is contained within the cassette and is responsive to a projector mounted activating mechanism.

8 Claims, 12 Drawing Figures

IMAGE PROJECTION SYSTEM WITH FILMSTRIP CASSETTE

The invention pertains to image projection systems, generally, and more specifically to film projector systems employing filmstrip cartridges or cassettes.

The twentieth century has witnessed the advent of broad and extensive use of audio-visual aids for various purposes. Educational institutions use then in classrooms; salesmen use them to tell the story of their products; people of all ages use them for sheer enjoyment. Therefore, it is not surprising to see continuous advancement being made in this area of technology. Indeed, people have come to expect it.

Today, the idea of enclosing a filmstrip into a cassette which, in turn, can be inserted in a film projector system is well known. Typically, such a system entails a projector-mounted film advancement mechanism having a movable member extending therefrom. The cassette usually has a movable structure, such as a frame or arm, with teeth extending laterally to engage perforations on the filmstrip. When the cassette is in the projector and the advancement mechanism is activated, the extending member is caused to engage and move the movable structure in the cassette, thereby causing the film to be advanced.

An example of such a cassette is described in a patent entitled "Film Projection Cartridge" by Ivars M. Skuja, U.S. Pat. No. 3,466,123. In his patent, Skuja teaches a film advancing mechanism which advances the film one frame at a time, masks each frame during image projection, and gates (i.e., prevents) image projection during film advancement. Skuja presumes that image gating is a desirable feature, and contends that the integration of the gating means into the film advancing mechanism is a decided advantage over other gating means because it avoids complicated interlocks which other systems use to synchronize the film advancement functions with the image gating and masking functions. While Skuja achieves this feature, he also introduces a complicated film advancing mechanism involving several film-engaging teeth and two gates which present rupture hazards to the film.

Skuja's presumption that image gating is desirable is logically dependent on a previous presumption that film advancement occurs slowly, and that therefore, overlapping images from successive frames will disturb the viewer. However, modern technology has made it possible to appreciably increase the speed of film advancement so that the overlapping frames do not appear on the screen long enough to disturb the viewer. Consequently, it is no longer necessary to gate the film while it is being advanced. Indeed, it is desirable to dispense with gating in the name of simplicity. In particular, it is desirable to have a simple film advancement mechanism which is devoid of extraneous gating facilities and which, therefore, more readily minimizes film rupture hazards.

A feature which is common to conventional cassettes including Skuja's is that the film can make contact with the skin of the person handling it and also can usually be advanced by external manipulation of the film advance mechanism of the cassette, all of which renders the film subject to possible damage. It is desirable to have a cassette which encases a filmstrip such that the film cannot be touched and such that the film cannot be advanced when the cassette is removed from the rest of the system.

Typically, a system using cassettes has a compartment or receptacle for receiving the cassette. The recess is generally located such that it will receive a cassette of fixed dimensions. This puts a constraint on the length of the filmstrip in the cassette. Thus, if the system is designed to receive a cassette which can encase a standard 300-frame filmstrip, it would not then be able to receive one encasing a 600-frame strip. However, if a particular film presentation is long enough to require more frames than are on the standard strip, as is often the case, then it is desirable to have a system which can receive various sized cassettes encasing various length filmstrips.

Film projection systems typically illuminate the film by means of a lamp whose light is focused by a condenser onto a mirror and reflected towards the film. Such an illuminating arrangement requires a high light-power output from the lamp on the order of 200 watts in order to overcome the light losses between the condenser and the film. In addition, a fan is needed to cool the interior of the projector because of the heat produced by the high-power lamp.

While Skuja does not describe a particular film projector, his cartridge anticipates one having a high-power lamp and a fan. This is shown by the fact that his cartridge incorporates a mirror in back of his projection aperture. (See Skuja's Claim 8.)

Film projection systems incorporating light directing devices such as light conducting rods are also known in the art. An example of such a system is described in a patent entitled "Motion-Picture Film Illuminator and Magnifying Viewer" by Charles L. Monson, U.S. Pat. No. 2,375,798. Monson describes a motion picture projector wherein the film is advanced by a sprocket located adjacent the light directing or transmitting member which directs light from a remote light source onto the film.

The projector taught by Monson, however, is not designed to accommodate a filmstrip cassette. Nor does he teach how to incorporate such a light directing member into a system which does accommodate a cassette. Nor is it obvious how to do it. Nevertheless, a cassette-projector system which incorporates light conducting rods would be desirable because light losses would be minimized thereby.

Sound tracks associated with filmstrips are also known in the art. Various combinations exist such as: a side-by-side filmstrip and sound tape in one cartridge, taught by Skuja; a single filmstrip with the sound track thereon; separate film and sound tapes with associated schemes for synchronizing the sound with the visual image. A desirable arrangement would be a film projection system having a detachable sound recorder-playback unit. The system could then be used with or without sound. Furthermore, if the sound unit worked on batteries, it would be portable and could be used independently of the visual display.

Accordingly, it is an object of this invention to provide a more reliable film projection system employing filmstrip cassettes.

Another object of the present invention is to provide a film projection system wherein the cassette-mounted film advancement mechanism activated by a projector-mounted device is devoid of complicated gating mechanisms which create risk of film rupture, and wherein this advancement mechanism cannot be readily activated when the cassette is removed from the rest of the system.

It is also an object of this invention to provide a cassette which completely encases a filmstrip such that the film cannot be touched by a person handling the cassette when the cassette is closed.

Yet another object of this invention is to provide a film projection system which can receive various sized cassettes encasing various length filmstrips.

A further object of the present invention is to provide a film projection system employing filmstrip cassettes having a light directing device with minimum light loss.

Still another object of this invention is to provide a film projection system having an adaptable portable sound recorder-playback unit which can control the film advancement.

These and other objects and advantages of this invention are achieved by an image projection system for projecting visual images from a filmstrip encased in a cassette. The cassette contains an engagement mechanism comprising a reciprocally biased arm with an extending finger that engages a perforation in the filmstrip in an advanceable manner. Mounted on the base of the projection system is a receptacle designed to receive the cassette in a position suitable for projecting an image onto a viewing surface.

A light source for illuminating the filmstrip is also mounted on the base adjacent a light directing device for directing and coupling the light from the source onto the filmstrip. The light directing device is mounted adjacent the receptacle and comprises a bundle of curved optical fibers seated on a platform which is switchable or pivotable from a passive position to a light coupling position upon insertion of the cassette into the receptacle and from the light coupling position to the passive position upon its removal.

An activating mechanism comprising a solenoid for activating the engaging mechanism and advancing the filmstrip is mounted on the base so that a movable bar responsive to a current in the solenoid is aligned longitudinally with the reciprocally biased arm. When an electric signal is applied to the solenoid, the bar moves longitudinally therewithin, its free end forcing the arm in a film-advancing direction. The reciprocal bias then returns the arm, thereby forcing the bar to its original position.

An optical focusing device such as a barrel lens is mounted on the receptacle such that the image from the illuminated film is focused by the lens onto a viewing surface.

A conventional power supply is used to furnish electrical power to the light source and to the solenoid in a conventional manner. An on-off switch turns the power on and may also turn the light switch on. The activating signal to the solenoid can emanate from a manually operated push button. However, when the system is used in conjunction with a synchronized audio presentation, an audio tape deck or recorder is used to provide an inaudible activation signal to the solenoid, in addition to the audible voice presentation. The inaudible signal activates the solenoid and advances the film automatically. A holding button is depressed to temporarily block this signal and prevents advancement of the film when it is desired to view a particular frame longer than the time interval between successive inaudible signals.

The invention will be described in greater detail in conjunction with the accompanying drawings wherein.

Figure 1:
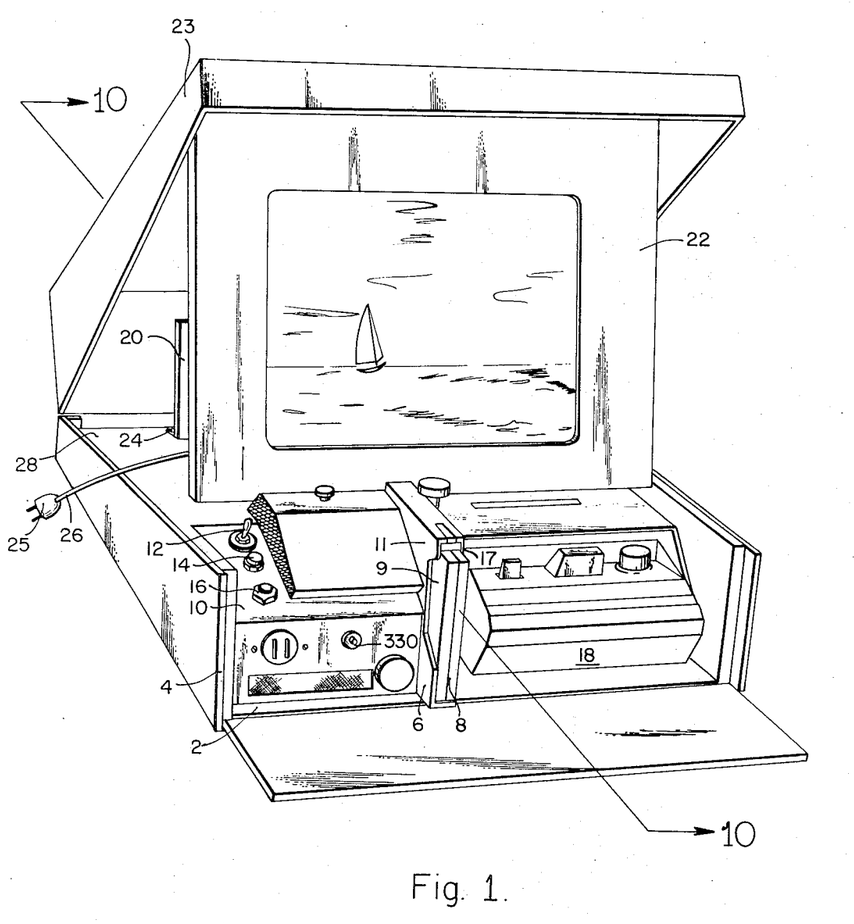
FIG. 1 is a perspective view of the image projection system according to one embodiment of the invention.

Referring now to FIG. 1, there is shown a perspective view of an image projection system according to one embodiment of the invention, wherein a base 2 is seated in a case 4 which is provided for the user's convenience and can be closed to resemble an attache case. At the front of the base 2 is mounted a receptacle 6 for receiving a filmstrip cassette 8 with a removable side wall 9. On a front plate 10 adjacent one side 11 of the receptacle 6 are: an on-off toggle switch 12, a film-hold button 14; and a fast film-advance button 16. Adjacent another side 17 of the receptacle 6 is a removable tape recorder 18. Mounted at the rear of the base 2 is a mirror 20, biased to a vertical position by spring hinge 21, which reflects images onto a rear projection screen 22. When the case 4 is closed, the mirror 20 is folded face down and held by the cover 23 of the case 4. The screen 22 is connected to the cover 23 by a hinge 24 and folds into the cover 23 as the cover 23 is brought down to close the case 4. When the cover 23 is lifted, the screen 22 swings down and the mirror 20 pops up to the positions shown. When an audio-visual presentation is made, the tape recorder 18 furnishes sound synchronized with the images projected on the screen 22.

The system is designed to function electrically either on alternating current coupled to internal circuitry from a conventional external power source (not shown) via the plug 25 and cord 26 or on batteries which can be placed in a rear compartment 28 of the base 2. The toggle switch 12 controls the supply of power to the system.

The operation or the system is completely described below following the descriptions of the various parts of the invention.

Figures 2, 2A, 6, 7, 8:
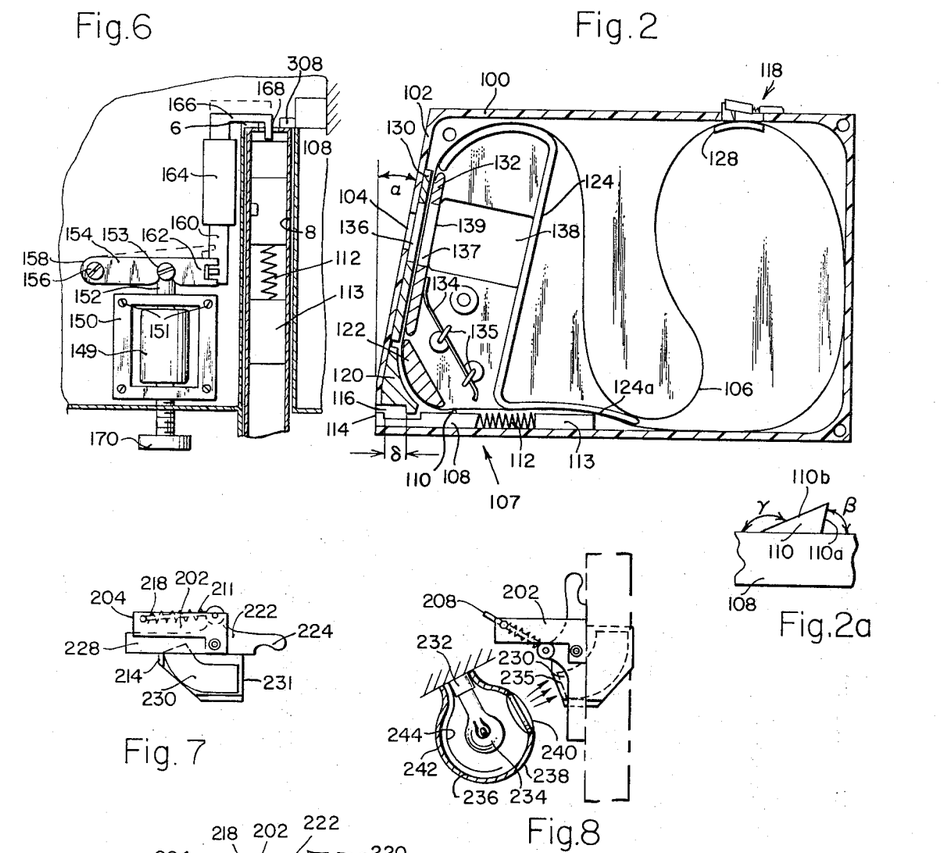
FIG. 2 is a cross-sectional view of a cassette according to one embodiment of the invention.
FIG. 2a is a blowup of the finger shown in FIG. 2.
FIGS. 5 and 6 are partial cross-sectional plan views of two embodiments of the activating mechanism engaging the cassette of FIG. 2.
FIGS. 7 and 8 are plan views of the light directing mechanism of the invention in two separate positions.

The cassette 8 of FIG. 1 is shown in cross-section in FIG. 2 with the side wall 9 removed and comprises a housing 100 having a front wall 102 which forms an acute angle $\alpha$ with the vertical. The purpose of positioning the front wall 102 in this way will become clear from further discussion below. The front wall 102 has an aperture 104 whose size is essentially that of a single frame of a filmstrip 106 shown housed in the cassette 8. At the bottom of the housing 100 is a film-engaging mechanism 107 for advancing the filmstrip 106, comprising an arm 108 with a finger 110 extending upward therefrom and a U-shaped recess 111 defined therein. The finger 110, shown in greater detail in FIG. 2a, has a triangular profile wherein a first side 110a forms an angle $\beta$ of no more than 90° with the arm 108 and a second side 110b forms an angle $\gamma$ of preferably 135° or more but in any event at least 90-degrees with the arm 108. A spring 112, anchored to a stop 113 in the bottom of the housing 100, biases the arm 108. An end 114 of the arm 108 communicates externally through an opening 116 in the housing 100 below the front wall 102 as shown. At the top of the housing 100 is a film-retarding mechanism 118, shown in detail in FIGS. 3 and 4, and described below.

Within the housing 100 are first, second and third guides 120, 122 and 124, respectively, which guide the filmstrip 106 past the aperture 104. Guides 122 and 124 as well as stop 113 also guide the filmstrip 106 past the finger 110. A fourth guide 128 guides the filmstrip 106 past the film-retarding mechanism 118. Within the housing 100 and adjacent and parallel to the front wall 102 are first and second plates 130 and 132. Plate 130 is fixed against the front wall 102. The filmstrip 106 passes between the plates. Plate 132 is held in position by a pressure bar 134 positioned within the housing 100 by clamps 135 as shown. Plates 130 and 132 have apertures 136 and 137, respectively, which are larger than the aperture 104. These plates 130 and 132 hold the filmstrip 106 firmly in plate when an image is being projected.

A tunnel 138 having a forward wall 139 exists in the housing 100 in back of the aperture 104 and the plates 130 and 132 to accommodate an illuminating apparatus which can fit therein and illuminate the filmstrip 106. The aperture 137 allows the light to pass through the filmstrip 106, while the apertures 104 and 136 allow the image to be projected from the film.

An external activating mechanism (shown in FIGS. 5 and 6) communicates with the end 114 of arm 108, urging it against and thereby compressing the spring 112. As the arm 108 moves thus, the first side 110a of the finger 110 engages one of a series of spaced perforations (see FIG. 4) in the filmstrip 106 and advances the filmstrip 106 thereby. Thereafter the spring 112 expands, biasing the arm 108 to return to its initial position. Because the angle $\beta$ is no greater than 90°, the filmstrip 106 cannot ascend the finger 110 and disengage itself during advancement. Because the second side 110b of the finger is inclined at angle $\gamma$, when the arm 108 is returned by the expansion of the spring 112, the filmstrip 106 ascends along the incline of side 110b and thereby becomes disengaged.

A projection 121 from guide 120 extends into the recess 111, thereby constraining the motion of the arm 108 to a distance $\delta$ equal to the length of the recess 111 minus the length of the projection 121. This distance $\delta$ is designed to be essentially equal to the length of a filmstrip frame, thereby insuring that the filmstrip 106 will be advanced one frame at a time.

Figures 3, 4, 9:
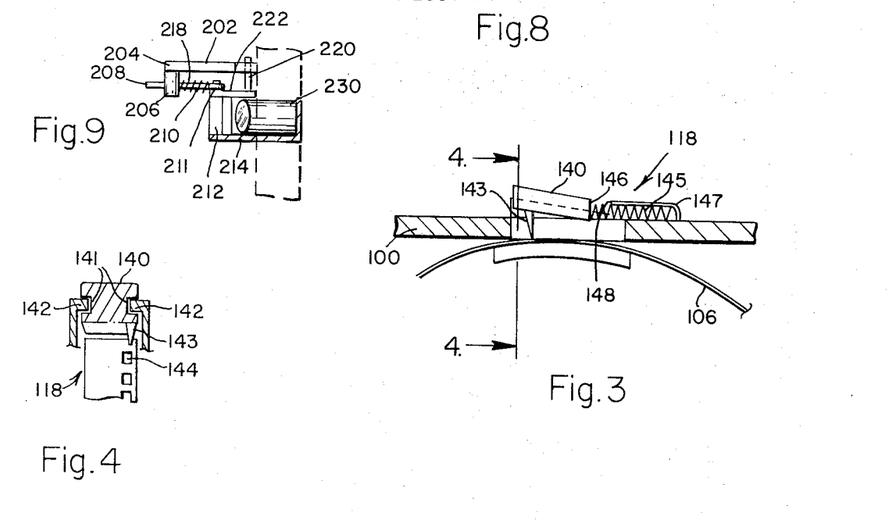
FIG. 3 is a blowup of the film-retarding mechanism shown in FIG. 2.
FIG. 4 is a cross-sectional view of the mechanism of FIG. 3 taken along section 4—4.
FIG. 9 is a side view of the light directing mechanism as positioned in FIG. 8.

The film-retarding mechanism 118 shown in FIGS. 3 and 4 comprises an inclined arm 140 having parallel tracks 141 on opposite sides thereof. Two parallel inclined rails 142 extend upward from the top of the housing 110 and engage the tracks 141 such that the arm 140 rides thereon. A finger 143 extends downwardly from the arm 140 between the rails 142 and toward one of the aforementioned perforations 144 in the filmstrip 106. A spring 145 is attached to the lower end 146 of the arm 140 and is anchored to a spring stop 147. When the arm 140 is forced down along the rails 142, the finger 143 engages one of the perforations 144 and retards the filmstrip 106 and the spring 145 is compressed. When the arm 140 is released, the spring 145 forces the arm 140 back up along the inclined rails 142, thereby causing the finger 143 to rise and disengage the perforation 144 in the filmstrip 106. An end 148 of the stop 147 abuts the lower end 146 of the arm 140 when the arm 140 is forced down the inclined rails 142. The guide 147 thereby limits retardation of the filmstrip 106. The length of the rails 142 and the position of the finger 143 on the arm 140 are chosen to insure that the retardation of the filmstrip 106 is limited to a single frame at a time.

The filmstrip 106 is easily loaded into the cassette 8. The side wall 9 is removed therefrom and the pressure bar 134 is released. The edge of the portion of the filmstrip 106 is carefully inserted between the pressure plates 130 and 132. Another portion of the filmstrip 106 is inserted between the guides 120 and 122, and a third portion is inserted between stop 113 and a tail end 124a of guide 124. A fourth portion of the filmstrip 106 is inserted between guide 128 and the film-retarding mechanism 118. The remainder of the filmstrip 106 is easily tucked within the housing 100 as shown. The side wall 9 is replaced on the housing 100 and the cassette 8 is ready for use.

The height and width of the cassette 8 are determined by the size of the receptacle 6, but the length is determined by the length of the filmstrip which it must accommodate. The cassette 8 may protrude beyond the confines of the receptacle 6 without inhibiting the operation of the system in any way. Therefore, while a particular receptacle 6 may be designed to receive a 300-frame filmstrip cassette without protrusion therefrom, it may as readily receive a 600-frame filmstrip cassette which does protrude.

The cassette 8 is preferably made from plastics, primarily for economy and simplicity of production. However, other material may be used if desired.

Figure 5:
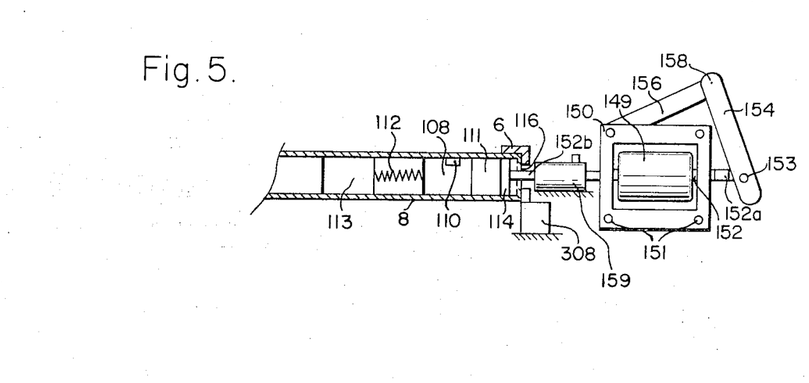

FIG. 5 shows a plan view of the activation device according to one embodiment of this invention. A conventional solenoid 149 is seated in a frame 150 which is mounted on the base 2 by screws 151 of any other convenient means. A bar 152 is positioned within the core of the solenoid 149 and has a magnetically attractable end 152a pivotally connected to an intermediary point 153 on a cross-member 154, which, in turn, is pivotally connected to an anchor 156 at its end 158. By pivotally connecting the bar 152 to the member 154, the bar 152 is supported by the member 154 but is free to move into the solenoid 149 without cocking. The anchor 156 is secured to the frame 150 but may be secured to the base 2 if desired. A free end 152b of the bar 152 extends beyond the solenoid 149 to communicate longitudinally with the end 114 of the arm 108. A sleeve 159, secured to the base 2 by any convenient means such as a weld, guides the free end 152b and prevents the bar 152 from cocking.

The solenoid 149 functions as an activating mechanism for activating the film engaging mechanism 107.

When an electric signal is applied to the solenoid 149, a magnetic force is established which attracts the magnetic end 152a of the bar 152, forcing the bar 152 into the core of the solenoid 149. The free end 152b of the bar 152 forces the arm 108 to compress the spring 112. The finger 110 is thereby caused to engage the filmstrip 106 as previously discussed. The spring 112 then expands, returning the bar 152 to its original position. The process repeats when the solenoid 149 receives the next activation signal.

The return motion of the bar 152 is restricted by the member 154 which prevents the bar 152 from coming out of the core of the solenoid 149 upon its return. An alternative to the member 154 might be a conventional stop which could also limit the return motion of the bar 152. The support furnished by the member 154 to the bar 152 is unnecessary if the bar 152 fits slidably snugly in the core of the solenoid 149.

In FIG. 6 the solenoid 149 is located adjacent rather than beyond the receptacle 6. The bar 152 does not communicate directly with the arm 108; therefore, in order to move the arm 108, the motion of the bar 152 due to the aforementioned magnetic force must be transferred to the arm 108 by a mechanical coupling. Accordingly, in FIG. 6 a linkage member 160 is pivotally connected to another end 162 of cross-member 154 and is supported and guided by a sleeve 164 which is secured to base 2 by a weld or any other convenient means. An L-shaped leg 166 extends laterally from the linkage member 160 such that its free end 168 communicates longitudinally with the end 114 of arm 108. The anchor 156 is secured to the base 2 in FIG. 6 but may be secured to the frame 150 as in FIG. 5.

A set screw 170 shown in FIG. 6 can be set to limit the motion of the bar 152 into the solenoid 149, thereby limiting the force exerted by the free end 168 of the leg 166 on the arm 108. Proper positioning of the set screw 170 will also ensure that the arm 108 is forced sufficiently to advance the filmstrip 106 by one frame. In FIG. 5 this limitation is ensured by the initial positioning of the bar 152, thereby precluding the need for the screw 170. Furthermore, the cross-member 154 can be positioned such that it abuts the frame 150 when the bar 152 has moved the arm 108 to the desired distance.

FIG. 7 is a plan view of the light directing machanism of the invention in a passive position, and FIG. 8 is a plan view of this mechanism in a light coupling position. FIG. 9 is an elevational view of this same mechanism in the light coupling position. Referring now to these figures, there is shown a cantilevered support member 202 welded to the side of the receptacle 6, although it may be connected thereto by bolts or any other convenient means. Extending down from the cantilevered end 204 of the support member 202 is a collar 206 through which passes the free end 208 of a sliding rod 210. The rod 210 is secured at its other end 211 to a post 212 by a screw 213. The post 212 extends upward from a pivot platform 214. An offset spring 218 is coaxially positioned over the rod 210 between the collar 206 and the post 212 to bias the rod 210 and the platform 214 to one of two extreme positions. The platform 214 is connected to the member 202 by a pivot rod 220, as shown, about which the platform 214 is able to pivot as the rod 210 slides in or out of the collar 206. Associated with the platform 214 is a structure 222 comprising first and second guide members 224 and 228, respectively.

While the guide members 224 and 228 are shown as opposite extremities of structure 222, they may also be continuous extremities of the platform 214 itself, thereby rendering the structure 222 unnecessary. Mounted on the platform 214 is a curved bundle of optical fibers 230 which direct and transmit light with minimum loss of light energy. The nature of the fiber bundle 230 is described by Brian O'Brien in his patent entitled "Optical Image Forming Devices," U.S. Pat. No. 2,825,260, and is preferably of a fiber optic material sold under a registered trademark by the Fiber Optics division of American Optical Company and referred to as Image Conduit. In addition to having the advantages described by O'Brien, the Image Conduit filters out approximately 80 percent of the infrared radiation from any incident light thereon. Therefore, when Image Conduit is used for the fiber bundle 230, only 20 percent of the infrared heat from the light source (discussed below) is transmitted to the filmstrip 106. In conventional image projection systems, a blower or convection cooler is used to remove the heat from the neighborhood of the film. With Image Conduit this is not necessary.

When the cassette 8 is inserted in the receptacle 6, its front wall 102 engages the first guide member 224, thereby causing the platform 214 to pivot about the pivot rod 220 until the second guide member 228 abuts the side of the receptacle 6. The fiber bundle 230 is thereby biased to a light coupling position in the tunnel 138 of the cassette 8 and communicates optically with that frame of the filmstrip 106 which is directly in back of the window 104. An edge 231 of the platform 214 extends into the tunnel 138 at this time. When the cassette 8 is removed from the receptacle 6, the forward wall 139 of the tunnel 138 engages the edge 231. This causes the platform 214 to pivot back about pivot rod 220 to its original passive position. The offset spring 218 prevents the platform 214 from pivoting further. The platform 214 is easily pivoted back and forth upon insertion and removal of the cassette 8 and, therefore, the cassette 8 is easily inserted into and removed from the receptacle 6.

An electric light fixture 232 is mounted on the base 2 and receives a light bulb 234 such that the bulb 234 is adjacent an end 235 of the fiber optics 230. A shield 236 is removably attached to the fixture 232 and surrounds and shields the bulb 234. In one wall 238 of the shield 236 is a condenser lens 240, and adjacent an opposite wall 242 of the shield 236 is a curved reflector 244. The shield 236 is secured to the fixture 232 so that direct light from the bulb 234 and reflected light from the reflector 244 are focused by the condenser 242 essentially perpendicularly onto the end 235 of the fiber bundle 230. The fiber bundle 230 then directs the light therethrough in accordance with the teachings of O'Brien.

Figure 10:
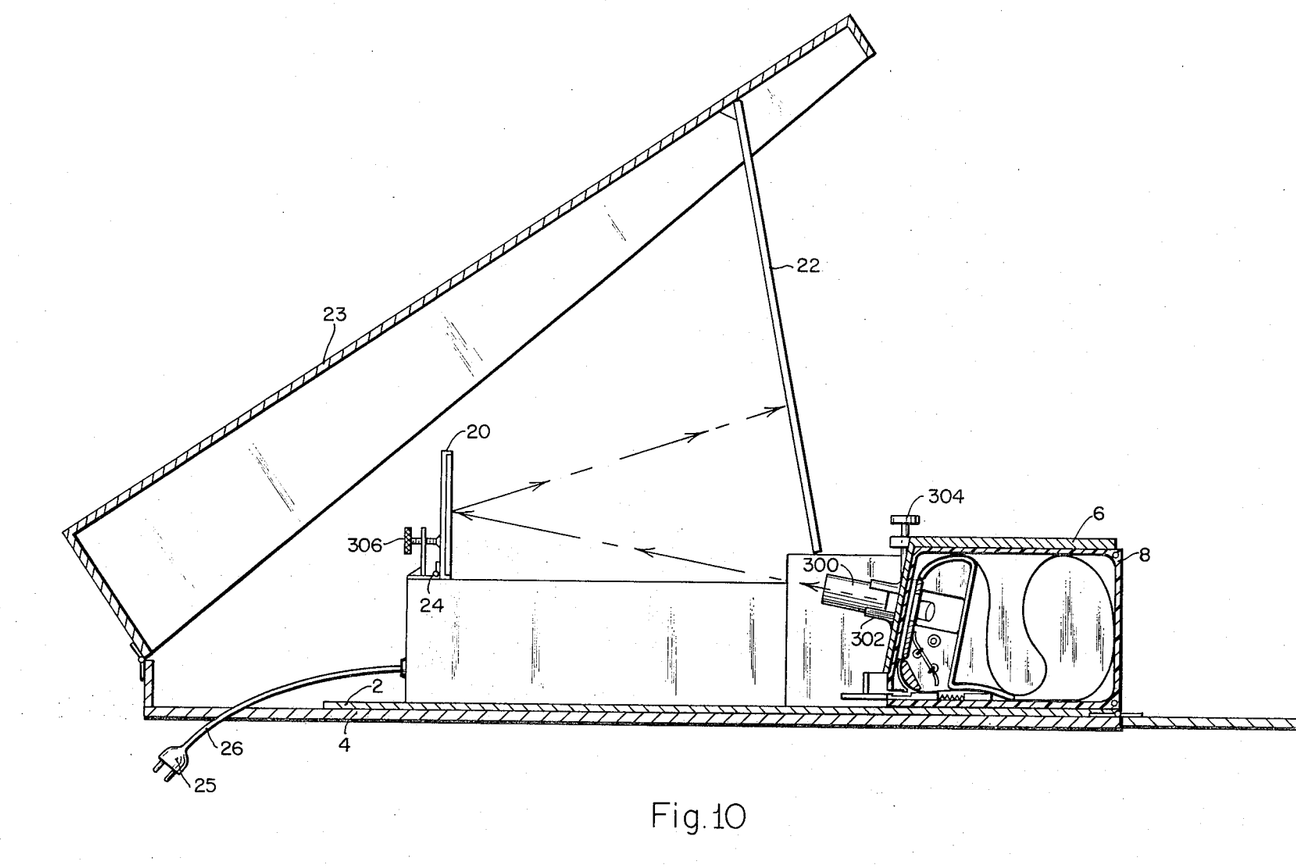
FIG. 10 is a cross-sectional view of the system shown in FIG. 1 taken through section 10—10.

FIG. 10 is a cross-sectional view of the system taken along section 10—10 of FIG. 1 and shows how an image is projected from film-strip 106 in the cassette 8 onto the screen 22. Light from the bulb 234 (not shown in FIG. 10) is directed onto the filmstrip 106 by the fiber bundle 230, causing an image to be projected through a barrel lens 300 which focuses the image onto the mirror 20. The barrel lens 300 is rigidly mounted in a clamp 302 which is slidably mounted to the outside of the receptacle 6 in a suitably conventional manner. The post 304 is connected to the clamp 302 and may be pushed back or forth to position the lens 300 for a properly focused image.

The image is reflected by the mirror 20 onto the rear of the rear projection screen 22 and is viewable from the front. The mirror 20 can be adjusted by the set screw 306 for proper alignment of the image on the screen 22 and is shown in an essentially vertical position. The screen 22 is at an acute $\alpha$ to the vertical as is the front wall 102 of the cassette 8. This arrangement allows the image to be reflected onto the screen 22 perpendicularly and, therefore, without angular distortion.

Conventional cassettes have vertical front walls, therefore, conventional back lighted systems require the mirror to be tilted back at an angle with the vertical in order to reflect the image up toward the screen. To avoid distortion in the conventional system, the screen must be tilted with respect to the vertical through twice the angle of the mirror. The image is thereby reflected onto the screen perpendicularly. However, the position of the screen will then be at an awkward angle for viewing by a person seated. The conventional alternative is to tilt the screen toward the vertical and distort the image somewhat. The alternative provided by this invention is to allow the angle $\alpha$ to be chosen such that a seated person can view the screen 22 in comfort. The angle $\alpha$ would be dependent on the size of the screen and the system. For a one foot square screen 22 for example, an angle of approximately 20° would be satisfactory.

Figure 11:
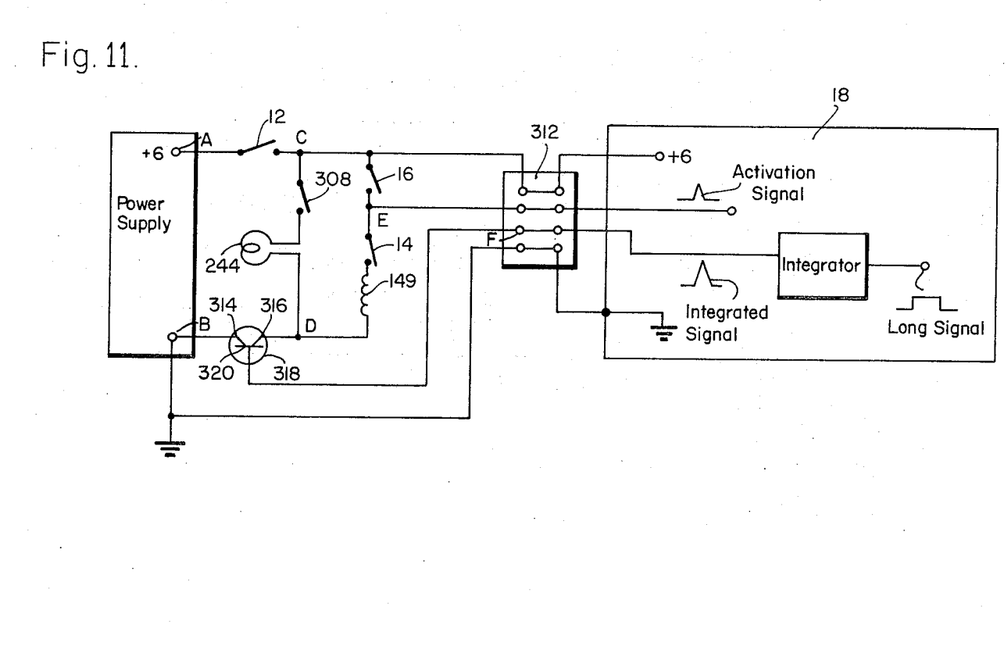
FIG. 11 is a schematic representation of the electric circuit according to one embodiment of this invention.

The operation of the system of the invention is best described with reference to FIG. 11 which is a schematic representation of the electrical interconnections of the system. A voltage of 6 volts for example is furnished by a conventional power supply between first and second terminals A and B. The power supply can be a battery or rectified house voltage reduced to a suitable voltage by a transformer. Six volts is a desirable voltage but it is not critical. The toggle switch 12 is connected between terminal A and a third terminal C and must be in an electrically conducting position for the system to receive power. The bulb 234 is connected in series with a push-button microswitch 308 (shown mounted on the receptacle 6 in FIGS. 5 and 6) between terminal C and a fourth terminal D. Switch 308 is spring biased to return to a non-conducting position unless held in an electrically conducting position. As the cassette 8 is inserted in the receptacle 6, it causes the fiber optics 230 to pivot into a light coupling position. When the cassette 8 is fully inserted in the receptacle 6, it holds the switch 308 in an electrically conducting position. The toggle switch 12 is switched to an electrically conducting position, providing power to the circuit. The bulb 234 then provides illumination to the filmstrip 106 via the fiber optics 230.

The fast film-advance button 16 which is spring biased to a non-conducting position is connected between terminal C and a fifth terminal E. The film-hold button 14 (spring biased to an electrically conducting position) and the solenoid 149 are connected in series between terminals D and E. The film-advance button 16 is depressed manually to an electrically conducting position providing an activating signal of 6 volts to the solenoid 149, which in turn activates the arm 108 as previously discussed. The finger 110 of FIG. 2 engages a sprocket hole in the filmstrip 106, and the motion of the arm 108 causes the filmstrip 106 to advance one frame. The spring 112 returns the arm 108 and the finger 110 disengages the filmstrip 106.

Automatic advancement of the filmstrip 106 is provided during a synchronized audio-visual presentation. The audio tape played by the tape recorder 18 provides an inaudible signal at each point in the audio presentation when the next frame of the filmstrip 106 is to be viewed. This signal may be amplified conventionally and is applied at terminal E to the solenoid 149 which is activated thereby. The filmstrip 106 is then advanced in the same manner as before. It should be noted that the film-advance button 16 can activate the solenoid 149 if depressed even during the aforementioned audio presentation. If it is desired to keep a particular image on the screen longer than the audio presentation requires and/or if it is desired to turn the sound off temporarily, the film-hold button 14 is depressed. This prevents the solenoid 149 from receiving any activation signal, whether from the tape recorder 18 or from the button 16. The tape recorder 18 is connected to the rest of the system via a jack 312, and the inaudible activation signal is coupled therethrough to terminal E.

The speed of the solenoid 149 is such that the system is able to advance the filmstrip 106 at a rate of 12 frames per second if desired. This is accomplished by furnishing 12 inaudible signals per second to the solenoid 149. One advantage of such a fast film advance rate is that action can be displayed as in the case of motion pictures. This points up the desirability of having the cassette 8 accommodate longer filmstrips. For example, if no action is to be shown, a 300-frame strip may be sufficient. But if 20 seconds of action is to be displayed, 240 frames is required for that action alone. Thus, if the presentation being made requires 300 still frames and 20 seconds of action, a 540-frame strip is needed. Since this system can receive long cassettes, as previously discussed, it can take advantage of the fast film advance rate to provide action in audio-visual presentations.

Another advantage of this fast film advance rate is that it renders gating of the film during advancement unnecessary. Any overlapping of successive frames lasts for only one-twelfth of a second and is hardly noticeable.

Emitter terminal 314 and collector terminal 316 of a conventional transistor 318 are connected between terminals B and D, and when switch 12 conducts, the transistor 318 is normally electrically biased so that conduction occurs between emitter 314 and collector 316 and essentially zero voltage appears between terminals B and D. Base terminal 320 of the transistor 318 is directly coupled to a sixth terminal F on the jack 312. When the audio presentation is over, a constant inaudible signal, lasting several seconds, is conventionally integrated and applied to terminal F. The integrated signal is such that when applied to the base terminal 320, conduction between the emitter 314 and the collector 316 of transistor 318 ceases in accordance with well known electronic principles. As a result, there is essentially an open circuit between terminals B and D. The power is thus isolated from the rest of the circuit. To reconnect the power, toggle switch 12 must be switched to the nonconducting position, and then back to the conducting position in order to allow the transistor 318 to become biased normally once again.

The system described herein can also be used in conjunction with an external 35-millimeter filmstrip- or slide-projector which advances the frames by means of solenoidal action similar to the solenoid 149. Such a projector would require an adapter 330 which could couple the activation signal from the tape recorder unit or from the film-advance button to its solenoid. An advantage of using this system with such a projector in this manner is that the image therefrom could be projected on a much larger screen than is provided by the system described herein.

While a particular electrical circuit configuration has been described in conjunction with the invention, other circuit configurations compatible with the proper operation of this invention are possible and would be satisfactory. The system herein described entails a rear-projection screen, however, a front projection screen can also be used compatibly with this invention.

There has thus been shown and described an improved film projector system employing filmstrip cassettes. Although specific embodiments of the invention have been described in detail, other variations of the embodiments shown may be made within the spirit, scope and contemplation of the invention.

Accordingly, it is intended that the foregoing disclosure and drawings shall be considered only as illustrations of the principles of this invention and are not to be construed in a limiting sense.

What is claimed is:

1. An image projection system for projecting visual images from a filmstrip, comprising:
   a filmstrip cassette with a filmstrip advanceably disposed therein, said filmstrip having a series of spaced perforations entirely therealong;
   a base with receiving means affixed thereto for receiving said cassette;
   reciprocating arm horizontally movably disposed in said cassette beneath and essentially parallel to a portion of said filmstrip and biased in one direction;
   a finger projecting upward from said arm and disposed thereon beneath said portion of said filmstrip to engage one of said perforations when said arm is moved in a film advancing direction;
   illuminating means mounted on said base for illuminating said filmstrip;
   light directing means mounted on said base to couple light from said illuminating means onto said filmstrip, said light directing means being switchable from a passive position to a light coupling position upon insertion of said cassette into said receiving means and from said light coupling position to said passive position upon removal of said cassette;
   activating means associated with said base for activating said reciprocating arm and advancing said filmstrip; and
   optical focusing means for focusing said visual images from said illuminated filmstrip onto a viewing surface.

2. The system claimed in claim 1 wherein:
   said finger has a triangular profile with a film engaging first side which forms an angle with said horizontal arm no greater than 90° and a second side which forms an angle with the horizontal arm of greater than 90°; and
   said activating means comprises a solenoid responsive to an electrical signal, said solenoid being mounted on said base to communicate longitudinally with said arm upon introduction of said signal, said arm being moved along its longitudinal axis thereby and said finger engaging said perforation as a result thereof to engage and advance said filmstrip one frame, said bias returning said arm and removing said finger from said perforation after said filmstrip is advanced.

3. The system claimed in claim 2 wherein said angle between said second side and said horizontal arm is essentially 135°.

4. The system claimed in claim 3 wherein said portion of said filmstrip rests on the apex of said triangularly profiled finger prior to said engagement of said perforation by said finger and descends to said arm during said engagement of said perforation by said finger.

5. The system claimed in claim 4 wherein said cassette further comprises:
   a housing having an aperture in one face thereof, the size of said aperture being essentially that of one frame of said filmstrip, the plane of said aperture forming an acute angle with the vertical;
   a removable wall; and
   alignment means included in said housing for maintaining the plane of said filmstrip in essentially parallel alignment with the plane of said aperture.

6. The system claimed in claim 4 wherein:
   said bias is a spring; and
   said solenoid comprises a moving member whose length is disposed along said longitudinal axis in end-to-end communication with said arm, said moving member being responsive to said electrical signal and urging said arm against said spring upon introduction of said signal, said spring reciprocating said arm thereafter and returning said moving member thereby.

7. The system claimed in claim 4 wherein:
   said illuminating means comprises a light source and a condenser which focuses light from said source onto said light directing means; and
   said light directing means comprises a bundle of optical fibers affixed to a pivotable platform which engages the front of said cassette when said cassette is received by said receiving means and which engages an intermediary point of said cassette as said cassette is withdrawn from said receiving means.

8. The system claimed in claim 7 wherein said platform comprises a first projecting member which is engaged by the front of said cassette when said cassette is received by said receiving means, and a second projecting member which is engaged by an intermediary point of said cassette as said cassette is withdrawn from said receiving means.

* * * * *